United States Patent [19]

Kazakis et al.

[11] Patent Number: 5,673,493
[45] Date of Patent: Oct. 7, 1997

[54] TELECOPING DESICCANT CARTRIDGE FOR AN AIR DRYER DISPOSED IN AN AIR SYSTEM

[75] Inventors: Michael V. Kazakis, Simpsonville; T. Kevin Castle, Wellford, both of S.C.

[73] Assignee: Westinghouse Air Brake Company, Wilmerding, Pa.

[21] Appl. No.: 524,384

[22] Filed: Sep. 6, 1995

[51] Int. Cl.⁶ ............................................. F26B 21/06
[52] U.S. Cl. ................... 34/80; 34/82; 34/209; 34/300; 34/472; 55/517; 96/134
[58] Field of Search .................... 34/80, 76–79, 34/81, 82, 205, 209, 299, 472, 300; 55/517; 96/134; 62/94

[56] References Cited

U.S. PATENT DOCUMENTS

| | | |
|---|---|---|
| 4,865,815 | 9/1989 | Martin et al. ............ 422/122 |
| 5,330,723 | 7/1994 | Martin et al. ............ 422/122 |
| 5,423,129 | 6/1995 | Castle et al. |
| B1 4,720,292 | 9/1991 | Engel et al. ............ 55/337 |

*Primary Examiner*—Henry A. Bennett
*Assistant Examiner*—Dinnatia Doster
*Attorney, Agent, or Firm*—James Ray & Associates

[57] ABSTRACT

An air drying cartridge for use in an air drying system is disclosed. The air drying cartridge comprises a telescoping casing resiliently self adjustable in height which has an inner cylindrical apertured wall and an outer cylindrical apertured wall. The inner apertured wall has a facing surface, an upper end and a lower end. The outer apertured wall has a facing surface, an upper end and a lower end. The facing surface of the inner apertured wall is disposed to face the facing surface of the outer apertured wall thereby defining an opening therebetween. The air drying cartridge also includes a porous filter liner, a pair of sealing caps and a moisture absorbing material for extracting moisture from air flowing through the air drying cartridge. The porous filter liner is situated adjacent to each of the facing surfaces within the opening. One of the pair of sealing caps affixes to the upper ends of the apertured walls and another affixes to the lower ends of the apertured walls. The moisture absorbing material fills the opening between the filter liners and sealed therein between the sealing caps. The telescoping casing resiliently withstands compressive forces that would collapse, rupture or otherwise distort prior art dryer cartridges. The desiccant cartridge 30 exsiccates air more reliably and efficiently than prior art desiccant devices.

20 Claims, 5 Drawing Sheets

TELECOPING DESICCANT CARTRIDGE FOR AN AIR DRYER DISPOSED IN AN AIR SYSTEM

FIELD OF THE INVENTION

The present invention generally relates to an air drying element for use in a compressed air system. More particularly, the present invention pertains to an air drying cartridge which includes a telescoping stainless steel casing having both an inner and an outer apertured cylindrical wall assembly, a porous polyester filter media disposed adjacent to and lining a facing surface of each of the inner and outer apertured cylindrical wall assemblies, a pelletized desiccant material contained between each polyester media liner, and a pair of sealing caps one of which covering each end of the casing so that moisture is effectively removed from compressed air as it passes radially through the air drying cartridge.

BACKGROUND OF THE INVENTION

It is documented in pertinent prior art and generally well known in germane technical fields that a Westinghouse Air Brake Company C-1 air dryer is designed to remove moisture vapor from a stream of compressed air in which the air dryer is placed. In practice, the C-1 air dryer employs a single tower moisture removal, cleansing and regenerating system containing a desiccant material to absorb the moisture from the air. Specifically, as the compressed air passes through the air dryer, the desiccant material absorbs and retains the moisture suspended therein until the compressor stops operating. By design, the C-1 air dryer then automatically flushes a quantity of the dried compressed air back through the desiccant material to draw out the absorbed moisture. The stream of compressed air and the revaporized moisture it carries is then discharged to the atmosphere thereby regenerating the desiccant material.

Prior to the present invention, the C-1 air dryer used either a preformed desiccant block or a desiccant filled cartridge to perform the air drying function. Both of these desiccant devices proved disadvantageous in one or more respects.

The preformed desiccant block is basically a hollow, cylindrically shaped compressed block of calcium chloride (CaCl$_2$). This preformed desiccant block inserts into a desiccant chamber in the C-1 air dryer and is sealed therein by an annular rubber gasket on each end. Though the preformed desiccant block removes moisture from the compressed air, it presents a number of shortcomings. First, the desiccant block has a relatively small surface area which limits its moisture-collection capability. Second, the desiccant block tends to disintegrate into a relatively fine grit while in service which, if not trapped by a smaller, secondary filter, contaminates the compressed air system. In particular, the introduction of grit into the air stream could adversely affect the operation of various components of an air brake system disposed on a railway vehicle. Third, the desiccant block is relatively fragile and does not withstand rough handling. It can endure only moderate compressive loads before breaking up into a number of separate pieces. Once the desiccant breaks up, the desiccant block becomes unsuitable for further use because its moisture absorbing qualities are substantially impaired and the risk of contamination of, if not damage to, the compressed air system would become reality otherwise.

The typical desiccant filled cartridge as set forth in U.S. Pat. No. 5,423,129 teaches a desiccant device that overcomes most of the shortcomings of the preformed desiccant block. Though a substantial improvement upon the desiccant block, the typical desiccant cartridge likewise has its disadvantages.

The drawings of U.S. Pat. No. 5,423,129 illustrate how the typical desiccant cartridge is used within the C-1 air dryer system. FIG. 1 shows a cross-sectional view of the C-1 air dryer containing the desiccant cartridge, alternately referred to as a dryer element. The C-1 air dryer also includes a discharge air filter element, a discharge check valve, a purge volume, a purge check valve with a choke, and a sump volume. The dryer element of the C-1 air dryer, according to this reference, is a hollow, cylindrically shaped radial flow cartridge member which removes moisture or water vapor from compressed air passing through it.

Referring now to FIG. 2, the dryer element is shown in greater detail in this slightly enlarged view. It includes an outer perforated cylindrical shell or jacket which is capped by a pair of annular end sealing caps or members. The outer shell is a flat piece of stainless steel metal punched with a plurality of holes and then formed into a cylinder. The annular end sealing caps are composed of rubber.

In viewing FIGS. 2, 3, 4, and 5, of this reference, it is apparent that the rubber end caps are cup-shaped members having two flanges or rims, respectively. The outer flanges of the rubber end caps are molded to the exterior upper and lower ends of the outer perforated shell. As shown in FIGS. 4 and 5, the air drying element further includes an inner perforated cylindrical shell or jacket which is also constructed of stainless steel or some other corrosion-resistant material. The inner flanges of the rubber end caps are molded to the interior upper and lower ends of the inner perforated shell. FIGS. 2, 3, 4, and 5 also illustrate that the outer surfaces of each the rubber end caps are provided with outer annular beads and inner annular beads which apparently serve as sealing gaskets.

During assembly of the desiccant cartridge, the bottom end cap is molded to the lower ends of the perforated shells. After molding, a polyester felt support layer is placed against the inner surface of the outer perforated cylindrical shell and a similar polyester felt layer is situated against the outside surface of the inner perforated cylindrical shell. After the felt layers are positioned, a loose desiccant material is packed in the opening between the two felt layers. After the opening is filled, the desiccant cartridge is sealed by molding the top rubber end cap to the upper ends of the outer and inner perforated shells. In conjunction with the annular beads, the rubber end caps function not only to seal the ends of the desiccant cartridge but also to direct appropriately the air therethrough.

The outer and inner perforated shells provide a certain degree of physical strength to the prior art desiccant cartridge taught in U.S. Pat. No. 5,423,129. Experience has shown, however, that the prior art cartridge does not always withstand the compressive forces that its physical environment inflicts upon it. Rigid by design, these shells in practice often buckle, collapse, rupture or otherwise distort when subject to such compressive forces. Consequently, as with the prior art preformed desiccant block, desiccant material leaks into and contaminates the compressed air system. Conceivably, pieces of the perforated shells could break off and likewise adversely affect, if not damage, the pneumatic system. For these reasons, a new and improved desiccant cartridge that does not exhibit the failure modes of the prior art desiccant devices would be very well received in the field of pneumatics

OBJECTS OF THE INVENTION

It is, therefore, one of the primary objects of the present invention to provide a new and improved telescoping desiccant cartridge for use in a compressed air system.

Another object of the present invention to provide a new and improved telescoping air drying desiccant cartridge that is self adjustable in height so as to resiliently withstand compressive forces that would collapse, rupture or otherwise damage prior art dryer cartridges.

Yet another object of the present invention is to provide a unique telescoping air drying element which effectively removes moisture and dirt in an air brake system.

Still another object of the present invention is to provide an air dryer and filter element including a telescoping hollow, cylindrically shaped apertured shell, a felt media, and a pelletized molecular sieve desiccant therein for use in compressed air system.

Even another object of the present invention is to provide a moisture absorbing cartridge having an inner pelletized hydrated alumina desiccant material, an intermediate polyester felt filtering media, and an outer apertured telescoping stainless steel cylinder container which is capped by annular sealing caps.

A further object of the present invention is to provide an air drying element, for use in a compressed air system, comprising a telescoping apertured shell member, a porous filter media conforming to the facing boundaries of the apertured shell member, a pelletized desiccant material disposed within the porous filter media, and a pair of cap members sealing the ends of the apertured shell member wherein moisture is absorbed from air flowing through and by the pelletized desiccant material of the air drying element.

Yet a further object of the present invention is to provide a desiccant cartridge, for an air dryer, comprising a casing having an inner telescoping cylindrical apertured wall and an outer telescoping cylindrical apertured wall, a filter liner situated adjacent the facing surfaces of the inner and outer apertured walls, a pelletized moisture absorbing material disposed between the filter liner of the facing surfaces of the inner and outer apertured walls, and a sealing cap covering the respective ends of the casing whereby the incoming air passes through the outer and inner apertured walls, the filter liner, and the pelletized moisture absorbing material to extract moisture contained therein.

Yet another object of the present invention is to provide an improved desiccant cartridge which is simple in construction, efficient in operation, economical in cost, reliable in use, durable in service, and easy to install.

In addition to the objects and advantages of the present invention set forth above, various additional objects and advantages of the telescoping desiccant cartridge will become more readily apparent to those persons who are skilled in the air compressor art from the following more detailed description of the invention, particularly, when such description is taken in conjunction with the attached drawings and with the appended claims.

SUMMARY OF THE INVENTION

In a presently preferred embodiment, the present invention provides an air drying cartridge for use in an air drying system. The air drying cartridge includes a telescoping casing having an outer apertured wall assembly and an inner apertured wall assembly. The outer apertured wall assembly has an exterior cylindrical shell and an interior cylindrical shell. The exterior shell has an upper end and the interior shell has a lower end and a facing surface. The inner apertured wall assembly has an outside cylindrical shell and an inside cylindrical shell. The outside shell has a lower end and a facing surface and inside shell has an upper end. The facing surfaces are disposed to face each other thereby defining an opening therebetween. The exterior and outside shells of the outer and inner apertured wall assemblies, respectively, concentrically overlap and slide longitudinally over the interior and inside shells of the outer and inner apertured wall assemblies, respectively. The air drying cartridge also includes a porous filter liner, a pair of sealing caps and a moisture absorbing material. The porous filter liner is situated against each of the facing surfaces within the opening. One of the pair of sealing caps is affixed to the upper ends of the apertured wall assemblies and another is affixed to the lower ends of the apertured wall assemblies. The moisture absorbing material extracts moisture from air flowing through the air drying cartridge. The moisture absorbing material is disposed within and fills the opening between the filter liners and is sealed between the sealing caps thereby rendering the telescoping casing resiliently self adjustable in height. The telescoping casing resiliently withstands compressive forces thereby enabling the air drying cartridge to resist collapse, rupture or other damage that would adversely affect prior art dryer cartridges.

DESCRIPTION OF THE DRAWINGS

FIG. 6a-1 is an enlarged cross-sectional view of the telescoping desiccant cartridge of FIG. 6 illustrating an inner apertured wall assembly.

FIG. 6a-2 is a magnified view of the inner apertured wall assembly of FIG. 6a-1 along with a porous filter liner and a desiccant material.

FIG. 6b-1 is an enlarged cross-sectional view of the telescoping desiccant cartridge of FIG. 6 illustrating an outer apertured wall assembly.

FIG. 6b-2 is a magnified view of the outer apertured wall assembly of FIG. 6b-1 along with a porous filter liner and the desiccant material.

DETAILED DESCRIPTION OF THE INVENTION

Figure 1:
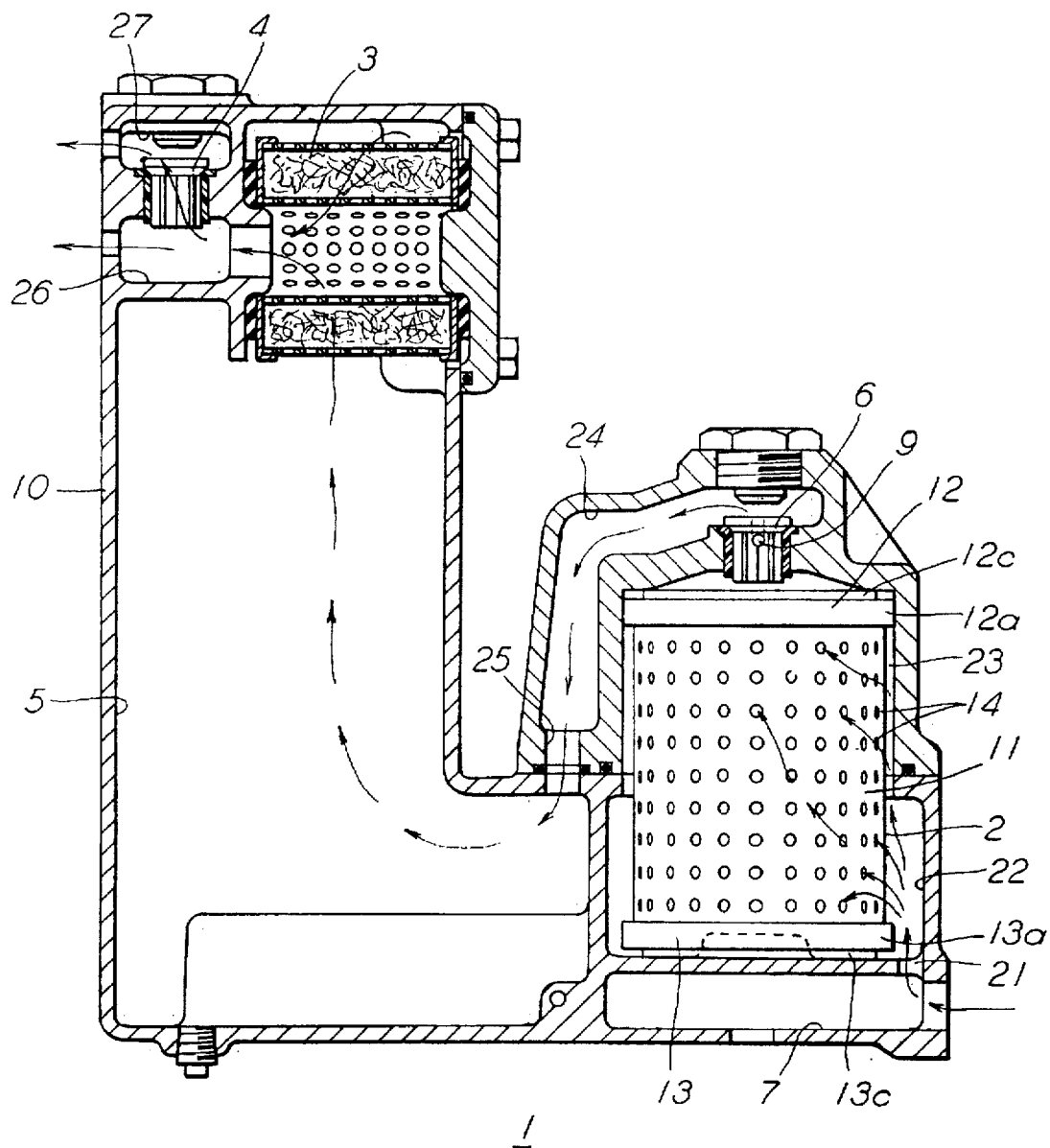
FIG. 1 is a side elevational view, partly in section, of an air dryer apparatus employing a prior art desiccant cartridge.

Referring to FIGS. 1 through 5, illustrated therein are the essential details of a C-1 air dryer apparatus including a prior art desiccant cartridge 2, alternately referred to as a dryer element 2. FIG. 1 illustrates a cross-sectional view of such C-1 air dryer 1 including air dryer casing 10. Such C-1 air dryer 1 includes a cartridge chamber containing the prior art desiccant cartridge 2. Such C-1 air dryer also includes a discharge air filter element 3, a discharge check valve 4, a purge volume 5, a purge check valve 6 with a choke 9, and a sump volume 7.

The following serves as a brief explanation of the various parts of such C-1 air dryer apparatus 1 into which the desiccant cartridge of the present invention inserts. Such C-1 air dryer apparatus 1 is designed to provide dried, compressed air to the various pneumatic systems, including the air brake system, of a railroad train consist. Such air dryer apparatus 1 receives from an air compressor (not shown) a supply of air. The moisture laden, compressed air passes into the sump volume 7, flows through a first opening 21 into a first chamber 22 then a passageway 23, and moves radially through the desiccant cartridge 2. The desiccant cartridge plays the key role in the system in that it absorbs moisture and traps other suspended particulates (e.g., dust, dirt, etc.) as the compressed air flows through such air dryer apparatus 1. Once such moisture and such particulates are extracted from the air stream, the cleansed, dry compressed air flows through purge check valve 6 through both a second chamber 24 and a second opening 25 into the purge volume 5.

The purge volume 5 is capable of holding approximately five-hundred cubic inches (500 in$^3$) of compressed dry air. When the air compressor is cycled to the "off" state, the dry compressed air then contained within the purge volume 5 passes slowly in the reverse direction through the choke 9 of the check valve 6 and through the desiccant cartridge 2 so that the collected moisture readily evaporates in the passing dry air and eventually exhausts to atmosphere. This purging of dry air back through the system serves to dry out and thus rejuvenate the desiccant cartridge 2. The desiccant cartridge 2 is then ready to remove again moisture from the incoming compressed air when the compressor is cycled to the "on" state.

The discharge filter 3 is integrally housed within the dryer casing 10 as a precautionary measure to reduce even further the possibility of contamination of the pneumatic systems. The discharge air filter 3 thus serves as a backup to the desiccant cartridge 2 in the event that the desiccant cartridge 2 deteriorates or otherwise breaks up. If the desiccant cartridge 2 does deteriorate, however, the discharge air filter 3 would at least for a limited time trap loose desiccant particles as well as other contaminants while permitting the flow of dry compressed air from purge volume 5 to a discharge chamber 26. Discharge chamber 26 connects to a supply valve (not shown). The flow of dry air continues through discharge chamber 26 through discharge check valve 4 through a terminal chamber 27 to a suitable air pressure reservoir {e.g., main reservoir} (not shown). Terminal chamber 27 also connects to a governor device (not shown).

The check valves 4,6 at either end of the such C-1 air dryer apparatus 1 control the entry and exit of air pressure from the air dryer system 1. At one end, the purge check valve 6 via the choke 9 permits unrestricted flow of moist, compressed air into the air dryer apparatus 1 during the compressor "ON" cycle. During the compressor "OFF" cycle (i.e., the purge cycle), the purge valve 6 controls the rate at which dry air flows from the purge volume 5 to exsiccate the desiccant cartridge 2. At the other end, the discharge check valve 4 prevents the backward flow of air from the air pressure reservoir to the purge volume 5 during the purge cycle.

Figure 2:
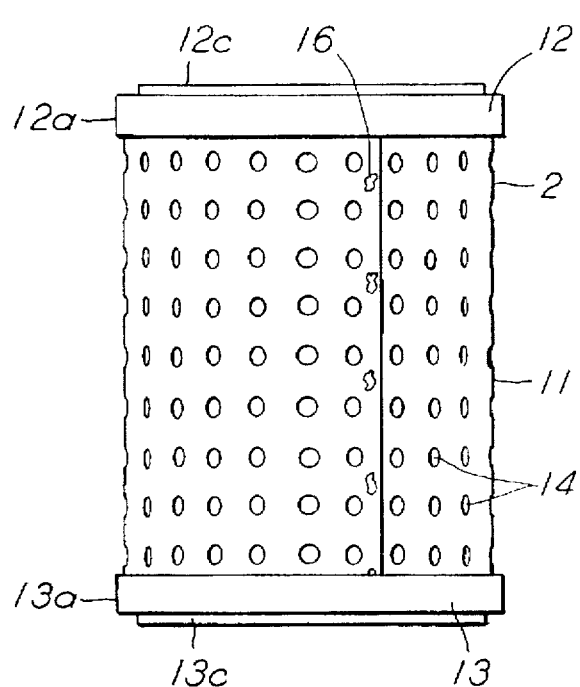
FIG. 2 is a slightly enlarged view of the prior art desiccant cartridge or air drying element illustrated in FIG. 1.
Figure 3:
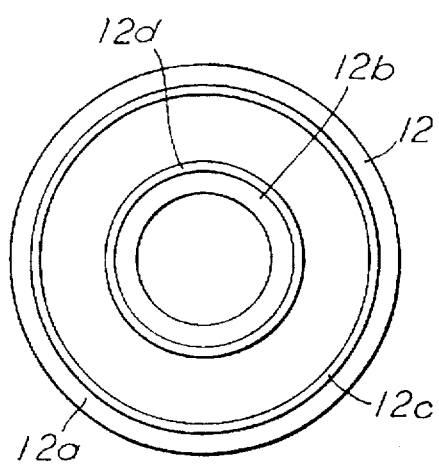
FIG. 3 is a top plan view of the prior art desiccant cartridge of FIG. 2.
Figure 4:
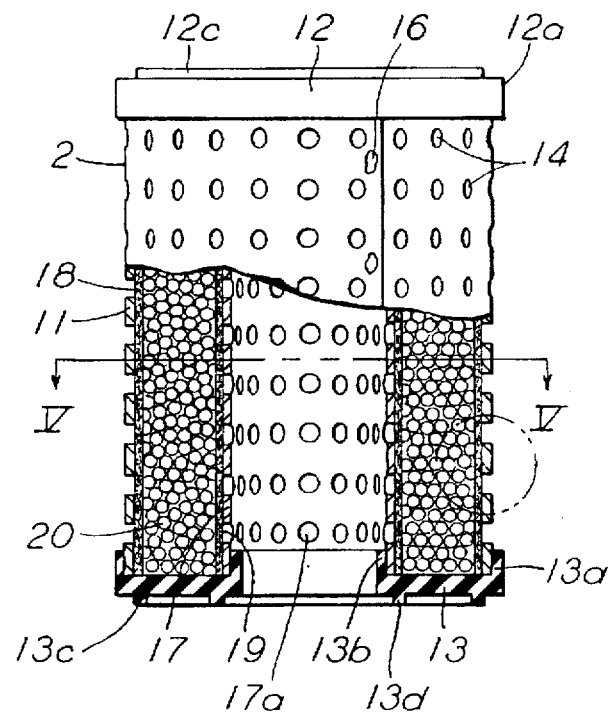
FIG. 4 is a partial cross-sectional view of the prior art desiccant cartridge.
Figure 5:
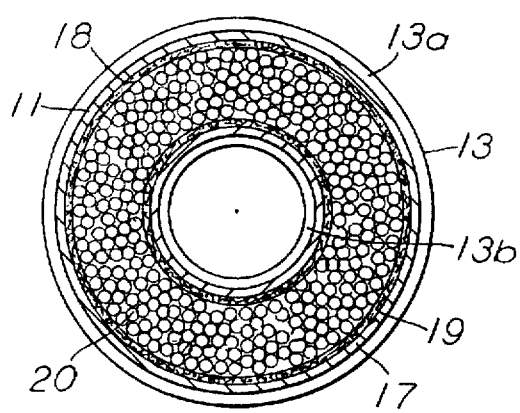
FIG. 5 is a cross-sectional view taken along line V—V of FIG. 4.
Figure 4A:
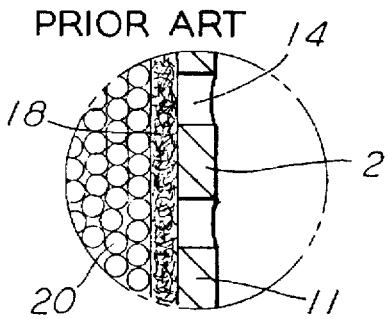
FIG. 4a is a magnified view of a prior art outer perforated shell, filter liner and desiccant material of the desiccant cartridge of FIG. 4.
Figure 7:
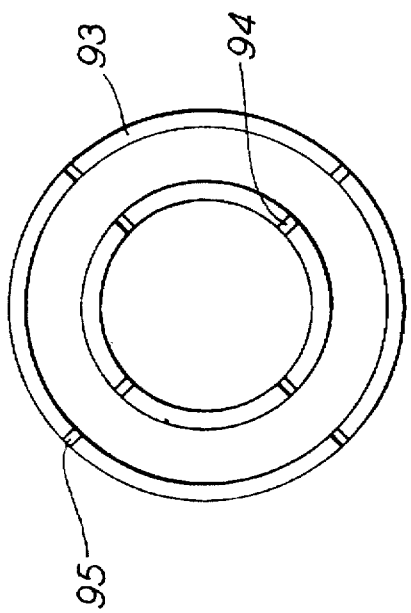
FIG. 7 is a top plan view of the desiccant cartridge of FIG. 6 showing a top sealing cap and indicators for aligning the desiccant cartridge within a cartridge chamber of the air dryer apparatus.
Figure 8:
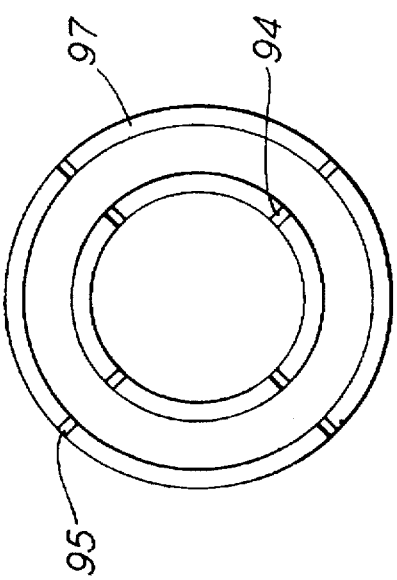
FIG. 8 is a bottom plan view of the desiccant cartridge of FIG. 6 showing a bottom sealing cap and indicators for aligning the desiccant cartridge within the cartridge chamber of the air dryer apparatus.
Figure 6:
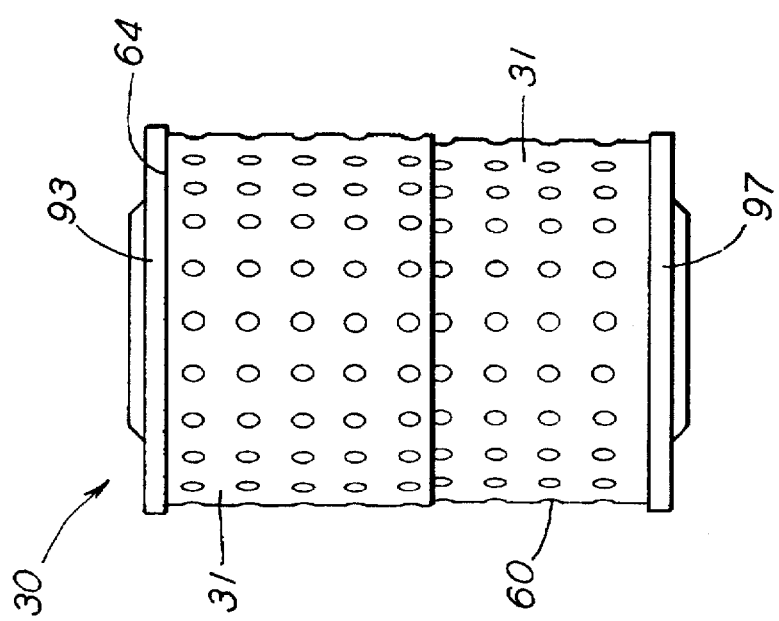
FIG. 6 is a side elevational view of a telescoping desiccant cartridge according to the present invention.
Figures 1, 6A:
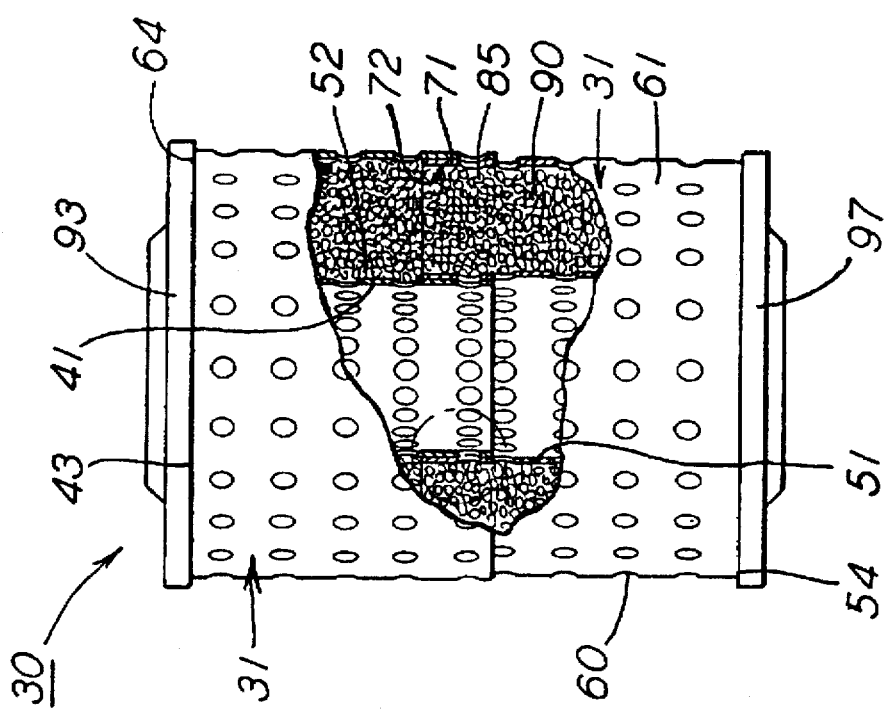
Figures 2, 6A:
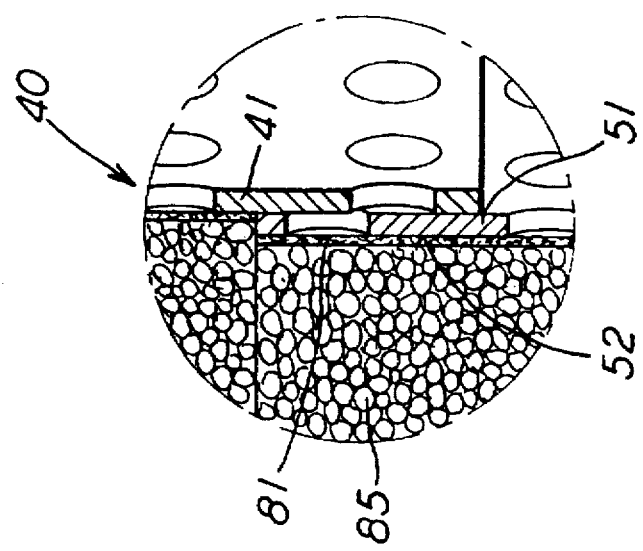
Figures 2, 6B:
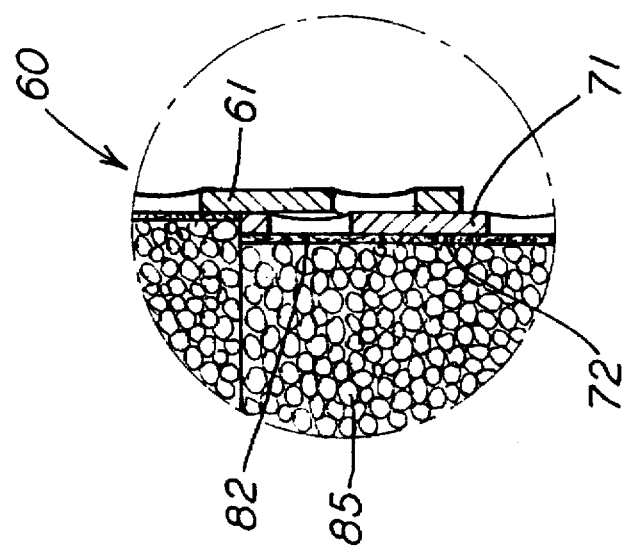
Figures 1, 6B:
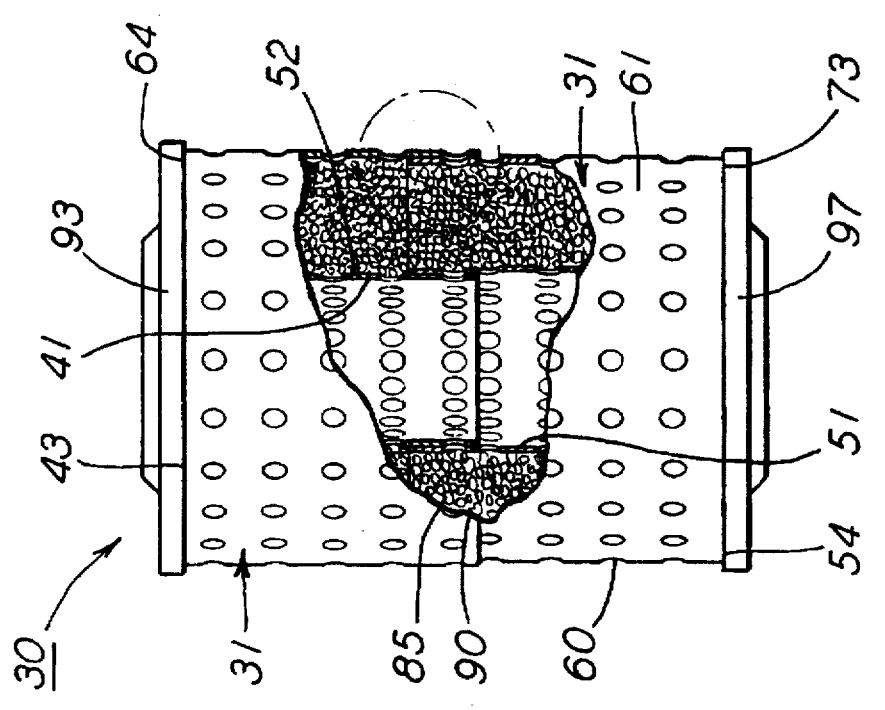

Referring to FIGS. 6 through 8, illustrated therein are the essential details of a presently preferred embodiment of the instant invention—a telescoping desiccant cartridge 30 for use in the air drying system 1 of FIG. 1. As illustrated in FIGS. 6 through 6b-2, the telescoping desiccant cartridge 30 includes a telescoping casing 31. The telescoping casing 31 has an inner apertured wall assembly 40 and an outer apertured wall assembly 60. The inner apertured wall assembly 40 has an outside cylindrical shell 51 and an inside cylindrical shell 41. The outside shell 51 of the inner wall assembly 40 has a lower end 54 and a facing surface 52. The inside shell 41 of the inner wall assembly 40 has a upper end 43. Similarly, the outer apertured wall assembly 60 has an exterior cylindrical shell 61 and an interior cylindrical shell 71. The exterior shell 61 of the outer wall assembly 60 has an upper end 64 and the interior shell 71 has a lower end 73 and a facing surface 72. The facing surfaces 52,72 of the inner and outer wall assemblies 40,60, respectively, are disposed to face each other thereby defining an opening 90 therebetween. As is best illustrated in FIGS. 6a-1 through 6b-2, the exterior shell 61 of the outer apertured wall assembly 60 concentrically overlaps and slides longitudinally over the interior shell 71 of the outer apertured wall assembly 60. Likewise, the outside shell 51 of the inner apertured wall assembly 40 concentrically overlaps and slides longitudinally over the inside shell 41 of the inner apertured wall assembly 40.

Referring generally again to FIGS. 6 through 6b-2, the telescoping desiccant cartridge 30 also includes a porous filter liner 81,82, a pair of sealing caps 93,97 and a moisture absorbing material 85. The porous filter liner 81,82 situates adjacent to and against each of the facing surfaces 52,72, respectively, within the opening 90. A first of the sealing caps 93 affixes to the upper ends 43,64 of the apertured wall assemblies 40,60. Likewise, a second of the sealing caps 97 affixes to the lower ends 54,73 of the apertured wall assemblies 40,60. The moisture absorbing material 85 fills the opening 90 between the filter liners 81,82 and is sealed between the sealing caps 93,97. The sealing caps 93,97 also provide a snug fit for the desiccant cartridge 30 within the air dryer system 1.

The construction of the telescoping desiccant cartridge 30 described above makes the instant invention structurally durable and flexible, characteristics absent from prior art desiccant cartridges. Prior art dryer elements often succumb structurally and operationally to compressive forces naturally visited upon such air dryer apparatuses 1. Their rigid casings often rupture or collapse causing release of the desiccant material or casing fragments or both into the compressed air stream which wreaks havoc on the various pneumatic systems.

The slidable, concentrically overlapping dual shell design of the two apertured wall assemblies 40,60 combined with the compressibility of the moisture absorbing material 85 renders the instant telescoping desiccant cartridge 30 resiliently self adjustable in height. The telescoping cartridge 30 thus resiliently withstands such compressive forces that would collapse, rupture or otherwise damage prior art dryer elements. Consequently, the desiccant cartridge 30 can exsiccate air more reliably and efficiently than prior art desiccant devices.

The air drying cartridge 30 can be designed for air dryer apparatuses 1 of varying sizes and to handle various degrees of compressive loads. In any given design, the telescoping desiccant cartridge 30 is resiliently self adjustable in height between an upper limit height and a lower limit height. During assembly, the opening 90 of the air drying cartridge 30 should typically be filled with the moisture absorbing material 85 when the telescoping casing 31 is at or above the upper limit height. Preferably, the moisture absorbing material 85 is under compression when the telescoping casing 31 is at the upper limit height. Increasing the quantity of moisture absorbing material 85 within the opening 90 causes a corresponding increase in the moisture collection capability of the air drying cartridge 30, as a result of the increase in effective surface area. (As is well known in the filter art, however, there is a tradeoff between the amount of moisture absorbing material that can be packed into the desiccant cartridge and the ability of the moisture laden material to withstand compressive forces without becoming damaged.) The air drying cartridge 30 and the moisture absorbing material 85 contained therein are designed so that they remain undamaged under compression when the telescoping casing 31 is reduced to at least the lower limit height.

As is well known to persons skilled in the pneumatic arts, various materials may used to make the critical filtering elements of the instant telescoping desiccant cartridge 30. The porous filter liner 81,82 is a needled polyester felt or like material capable of filtering particulates of at least four microns (4μ) in size from the air flowing through air drying cartridge 30.

The moisture absorbing material 85 is a mesh white activated alumina desiccant, preferably in pelletized form. For example, the pelletized desiccant may consist of approximately three sixteenths inch (3/16") sized beads or spheres of the activated alumina desiccant. The quantity of desiccant material 85 required to fill the opening 90 is approximately two and one-half pounds (2.5 lbs.) The apertured wall assemblies 40,60 are composed of a corrosion resistant material. The preferred corrosion resistant material is stainless steel or a plastic of similar strength. If stainless steel is chosen, each of the shells 41, 51, 61, and 71 may be formed from a flat piece of such metal punched or perforated with a plurality of apertures. The flat, perforated metal can then be looped into a cylinder with its longitudinal ends pinched, welded or similarly secured together to form a rigid, cylindrically shaped shell.

Referring now to FIGS. 7 and 8, the top and bottom sealing caps 93,97 each include alignment indicators 94 and 95, respectively, to be used for aligning the air drying cartridge 30 within the cartridge chamber of such air dryer system apparatus 1. The sealing caps 93,97 maybe composed of any one of a variety of materials and are preferably molded to the respective upper and lower ends of the apertured wall assemblies 40,60. Known to practitioners of the pneumatic arts, whatever material is ultimately chosen, it must capable of providing a sufficiently tight seal to prevent leakage of air from the upper and lower ends of the apertured walls assemblies. A preferred material for the sealing caps is at least one of black plastisol and a comparable PVC material.

As an added feature of the instant invention, the air drying cartridge 30 includes a means (not shown) for preventing separation of the exterior 61 and outside 51 shells of the outer 60 and inner 40 apertured wall assemblies, respectively, from the interior 71 and inside 41 shells of the outer 60 and inner 40 apertured wall assemblies, respectively. Though not necessary while the telescoping desiccant cartridge 30 is encased within the cartridge chamber of such air dryer apparatus 1, the separation prevention means is useful to prevent inadvertent opening of and spillage of the desiccant 85 from the air drying cartridge 30 during handling of the instant cartridge 30.

While the presently preferred embodiment and related aspects for carrying out the instant telescoping desiccant cartridge 30 have been set forth in detail in accordance with the Patent Act, those persons skilled in the pneumatic arts to which this invention pertains will recognize that various alterations and changes could be made to the instant invention without departing from the spirit and scope of the appended claims.

Accordingly, to promote the progress of science and useful arts, we secure for ourselves by Letters Patent exclusive rights to all subject matter embraced by the following claims for the time prescribed by the Patent Act.

We claim:

1. An air drying cartridge for use in an air drying system comprising:
    (a) a telescoping casing resiliently self adjustable in height having an outer apertured wall assembly and an inner apertured wall assembly wherein
        (i) said apertured wall assemblies are concentrically disposed to each other thereby defining an opening therebetween,
        (ii) each of said apertured wall assemblies have a pair of concentrically overlapping shells, each shell having an upper end and a lower end, and
        (iii) each of said apertured wall assemblies has a facing surface so that said facing surfaces are disposed to face each other across said opening;
    (b) a porous filter liner situated adjacent to each of said facing surfaces within said opening;
    (c) a pair of sealing caps
        (i) a first of which affixed to said upper ends of only one of said shells from each of said upper and lower apertured wall assemblies, and
        (ii) a second of which affixed to said lower ends of only a remaining one of said shells from each of said upper and lower apertured wall assemblies,
    so that said shells of said outer apertured wall assembly concentrically overlap and slide longitudinally over each other and said shells of said inner apertured wall assembly concentrically overlap and slide longitudinally over each other; and
    (d) a moisture absorbing material disposed within said opening between said filter liners and sealed between said sealing caps thereby rendering said telescoping casing resiliently self adjustable in height;
wherein said telescoping casing resiliently withstands compressive forces thereby enabling said air drying cartridge to resist damage and wherein said moisture absorbing material extracts moisture from air flowing through said air drying cartridge.

2. The air drying cartridge as recited in claim 1 wherein said telescoping casing is resiliently self adjustable in height between an upper limit height and a lower limit height.

3. The air drying cartridge as recited in claim 2 wherein said opening of said air drying cartridge is filled with said moisture absorbing material so that:
    (a) said moisture absorbing material is under compression when said telescoping casing is at said upper limit height thereby increasing a quantity of said moisture absorbing material contained within said opening and providing said air drying cartridge with enhanced moisture collection capability; and
    (b) said moisture absorbing material remains undamaged under compression when said telescoping casing is reduced to at least said lower limit height.

4. The air drying cartridge as recited in claim 1 wherein said sealing caps include indicators for aligning said air drying cartridge within a cartridge chamber of such air drying system.

5. The air drying cartridge as recited in claim 1 wherein said filter liner is a polyester felt material capable of filtering particulates of at least four microns in size from such air flowing therethrough.

6. The air drying cartridge as recited in claim 1 wherein said moisture absorbing material is a pelletized alumina desiccant.

7. The air drying cartridge as recited in claim 1 wherein said sealing caps are composed of at least one of black plastisol and a comparable PVC material.

8. The air drying cartridge as recited in claim 1 wherein said apertured walls are composed of a corrosion resistant material.

9. The air drying cartridge as recited in claim 8 wherein said corrosion resistant material is stainless steel.

10. The air drying cartridge as recited in claim 1 wherein each of said apertured walls has a plurality of apertures per square inch such that in a range between 25 and 75 percent of the surface area of each of said apertured walls is porous to such air flow.

11. The air drying cartridge as recited in claim 1 wherein said air drying cartridge includes a means for preventing separation of said exterior and outside shells of said outer and inner apertured wall assemblies, respectively, from said interior and inside shells of said outer and inner apertured wall assemblies, respectively, thereby preventing spillage of said moisture absorbing material from said opening.

12. An air drying cartridge for use in an air drying system comprising:

(a) a telescoping casing having an outer apertured wall assembly and an inner apertured wall assembly wherein
 (i) said outer apertured wall assembly has
  (1) an exterior cylindrical shell having an upper end, and
  (2) an interior cylindrical shell having a lower end and a facing surface, and
 (ii) said inner apertured wall assembly has
  (1) an outside cylindrical shell having a lower end and a facing surface, and
  (2) an inside cylindrical shell having an upper end,
so that said facing surfaces are disposed to face each other thereby defining an opening therebetween;

(b) a porous filter liner situated adjacent to each of said facing surfaces within said opening;

(c) a pair of sealing caps one of which affixed to said upper ends of said apertured wall assemblies and another of which affixed to said lower ends of said apertured wall assemblies so that
 (i) said exterior shell of said outer apertured wall assembly concentrically overlaps and slides longitudinally over said interior shell of said outer apertured wall assembly, and
 (ii) said outside shell of said inner apertured wall assembly concentrically overlaps and slides longitudinally over said inside shell of said inner apertured wall assembly; and (d) a moisture absorbing material disposed within said opening between said filter liners and sealed between said sealing caps thereby rendering said telescoping casing resiliently self adjustable in height;

wherein said telescoping casing resiliently withstands compressive forces thereby enabling said air drying cartridge to resist damage and wherein said moisture absorbing material extracts moisture from air flowing through said air drying cartridge.

13. The air drying cartridge as recited in claim 12 wherein said telescoping casing is resiliently self adjustable in height between an upper limit height and a lower limit height.

14. The air drying cartridge as recited in claim 13 wherein said opening of said air drying cartridge is filled with said moisture absorbing material so that:

(a) said moisture absorbing material is under compression when said telescoping casing is at said upper limit height thereby increasing a quantity of said moisture absorbing material contained within said opening and providing said air drying cartridge with enhanced moisture collection capability; and (b) said moisture absorbing material remains undamaged under compression when said telescoping casing is reduced to at least said lower limit height.

15. The air drying cartridge as recited in claim 12 wherein said sealing caps include indicators for aligning said air drying cartridge within a cartridge chamber of such air drying system.

16. The air drying cartridge as recited in claim 12 wherein said filter liner is a polyester felt material capable of filtering particulates of at least four microns in size from such air flowing therethrough.

17. The air drying cartridge as recited in claim 12 wherein said moisture absorbing material is a pelletized alumina desiccant.

18. The air drying cartridge as recited in claim 12 wherein said sealing caps are composed of at least one of black plastisol and a comparable PVC material.

19. The air drying cartridge as recited in claim 12 wherein said apertured wall assemblies are composed of corrosion resistant material.

20. The air drying cartridge as recited in claim 19 wherein said corrosion resistant material is stainless steel.

* * * * *